INVENTOR
CHRISTIAN J. ESTEL
ATTORNEY

United States Patent Office 2,755,197
Patented July 17, 1956

2,755,197

CIGARETTE TIPPING AND METHOD OF MAKING THE SAME

Christian J. Estel, Pittsburgh, Pa., assignor to Armstrong Cork Company, Lancaster, Pa., a corporation of Pennsylvania Application June 17, 1953, Serial No. 362,372

6 Claims. (Cl. 117—9)

According to the present invention, a cigarette tipping material is produced by first treating particles of cork with a cork-softening agent such as glycerine, propylene glycol, sorbitol, or other cork-softening agent of which there are many well known to those skilled in the art. The glycerine or its equivalent serves to soften the cork particles and alter their texture. Being nonfugitive, the softening effect remains throughout the life of the tipping. The softened cork granules are applied to an adhesive-coated sheet of paper or other backing layer, and the individual particles are rooted into the adhesive layer and project irregularly thereabove. The granules lie in essentially contiguous relationship, although because of the irregular shape of the particles there are minor openings which extend between certain of the particles and are evident when the material is viewed under a microscope. After the adhesive has set, the exposed upper surface of the cork particles is abraded, by sanding wheels, for instance, to provide a lip-engaging surface on the tipping which is characterized by a smoothness representative of essentially contiguous softened cork particles abraded to a smooth texture on their exposed upper surface.

A typical embodiment of the invention is illustrated in the accompanying drawing, in which.

Figure 1:
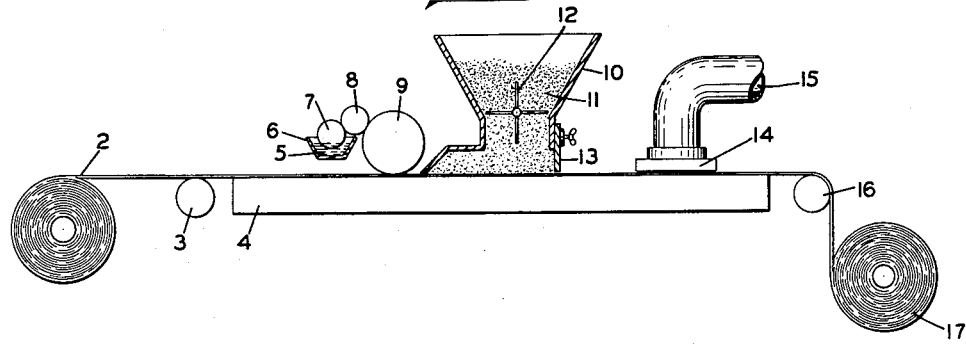
Figure 1 is a diagrammatic view illustrating a method of forming a cork particle coated strip of tipping material.

Referring to Figure 1, there is shown a reel of backing material 2 which may be tissue paper, about .0015 inch thick. The material 2 is fed from a roll over a guide roll 3 and table 4. An adhesive material which is essentially odorless, tasteless, nontoxic, and water-repellent is applied from a supply 5 thereof held in a trough 6. The adhesive is transferred to the upper surface of the backing layer 2 by transfer and contact rolls 7, 8, and 9 and is deposited as a thin film on the backing layer. A vinyl acetate type heat-sensitive adhesive is preferred. Where this type is used, provision will be made for heating the supply trough and the rollers. The adhesive-coated backing layer with the adhesive in a tacky condition passes under a hopper 10 containing powdered cork particles 11. An agitator 12 may be provided in the hopper to avoid any tendency for the particles to bridge therein. An adjustable doctor blade 13 constitutes the rear edge of the hopper and serves to limit the thickness of the applied layer of cork granules. It is preferred to have but a single layer of granules, each upstanding granule being rooted into the adhesive. This insures an upper surface on the finished product which will be essentially free of adhesive, as will be more fully hereinafter explained.

A suction head 14 is mounted over the table 4 above the path of travel of the coated backing layer and is connected by a conduit 15 to a suction fan. This serves to remove unattached cork particles from the surface of the product.

The backing with its applied layer of adhesive and rooted cork particles is fed over a roll 16 and may be formed into a tightly wound roll 17 and the material maintained in this condition until the adhesive has fully set and the cork particles have been firmly rooted into the adhesive layer. This is necessary where an adhesive which develops its final bond by solvent evaporation is used, such as the conventional lithographic ink type flocking adhesives.

The cork particles are pretreated with a cork-softening agent. This may be accomplished in any one of a number of ways. Preferably small cork particles are treated in a mixer with glycerine, about 10 to 25 pounds of glycerine being distributed over about 100 pounds of cork granules of a 90-to-dust size. The quantity of softening agent used will depend upon the effectiveness of the particular agent or mixture of agents used, some being more effective than others. After the particles have been uniformly coated, the mix may be discharged from the mixer and permitted to stand overnight to obtain the desired softening. The time required for softening will depend upon the size of the particles—larger particles requiring a longer period of softening than smaller particles—the temperature of treatment—the softening may be accelerated by heating the coated granules to a temperature of 120° F. to 160° F. for instance—and other variable factors. Where large particles are softened they may subsequently be reduced to the desired size by grinding in a Buhr mill, attrition mill, or other grinder. Most economically the softened cork particles may be obtained as a cut, i. e., a screening, of cork particles ground for general cork composition manufacture. For instance, a 90 to 100-mesh cut may be taken from cork particles ground for cork composition manufacture utilizing the 30–40 mesh cut, for instance. Either prime cork or so-called reground material may be used with equally satisfactory results so long as the particles are softened with glycerine or other cork-softening agent. The presence of minor amounts of contaminating materials such as are present in reground cork is not objectionable. The color of the particles may be slightly darker than prime cork granules, but this is not of serious consequence.

I prefer to use cork granules of a size between 90 and 200 mesh, U. S. Standard screen sizes. Mixed particles in such range, such as 100 to 200 mesh and the like, will be acceptable. The cork particles are generally of such fineness that substantially all will pass through a 90-mesh screen or will have an average fineness of 90 mesh or less.

Figure 2:
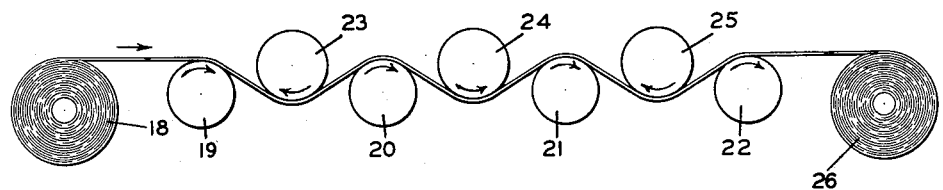
Figure 2 is a diagrammatic view illustrating a method of abrading the upper lip-engaging surface of the cork particle coated strip of Figure 1.

The abrading of the surface of the cork granules is essential in order to obtain a lip-engaging surface having the desired texture. The irregularly shaped cork particles although quite fine present a noticeable "roughness" to the lips and would be objected to by many smokers. The abrading operation may be accomplished as illustrated in Figure 2.

As illustrated, a roll 18 of tipping material, i. e., the tissue paper backing layer 2 carrying cork granules 11 bound thereto by the adhesive layer 5 is directed over feed rolls 19, 20, 21, and 22 which move in the direction of the arrows. Between adjacent pairs of feed rolls are sanding rolls 23, 24, and 25 which serve to abrade the upper surface of the cork granules and produce a smooth, fine-textured surface. The sanding rolls are driven at relatively high speed in the direction of the arrows and are preferably given a slight motion of oscillation along the direction of their axes to assist in obtaining the desired smoothness of the finished surface. Roll 23 may be covered with number 7/0 abrasive paper and rolls 24 and 25 with number 6/0 abrasive paper. The sanded tipping material as delivered from the abrading or finishing unit of Figure 2 is wound into a roll 26 and is ready for severance into strips of the desired width for use by the cigarette manufacturer.

Figure 3:
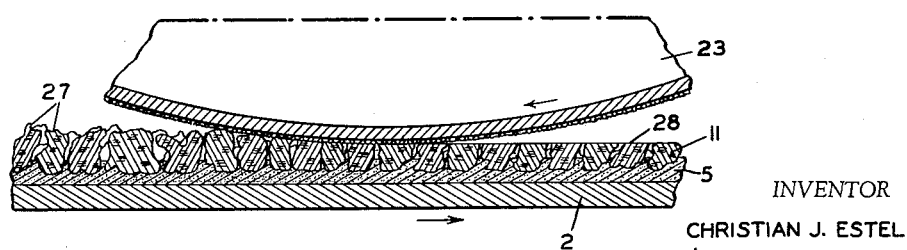
Figure 3 is an enlarged diagram illustrating the abrading step and showing the finished abraded product.

It will be noted by reference to Figure 3 which is to an enlarged scale and shows the initial sanding operation at roll 23 that the individual cork granules 11 lie essentially in contiguous relationship and that prior to sanding, the particles terminate in rough and irregular projections 27. The sanding operation produces an essentially smooth upper surface 28 as illustrated in the right-hand portion of Figure 3. It is obvious that when viewed under a microscope the surface will not be plane as shown, but this diagrammatically illustrates the effect of sanding. The surface produced has a velvety feel, and when the material is applied as a tipping to a cigarette, the texture of the lip-engaging surface is pleasant and indistinguishable from that of natural cork tipping. The number of sanding stages employed will depend upon the amount of cork to be removed to obtain the desired surface finish and final thickness, and other variable factors.

The finished product may be about .0032 to .0038 inch thick, including the .0015 inch tissue layer. To avoid the presence of any substantial amount of adhesive at the surface of the product after grinding, care must be used in applying the adhesive to insure that only a very thin layer is applied. As noted in Figure 3 when this precaution is observed, the lip-engaging surface of the product will be constituted wholly of the smooth, abraded, softened cork granules. Adequate adhesive must be used, however, to insure a firm rooting of the particles to eliminate the possibility of dislodgement of any substantial amount of the particles during the finishing operations and to avoid objectionable adherence of the particles to the lips of the smoker.

I claim:

1. A cigarette tipping material having the surface texture of natural cork tipping material comprising a thin flexible backing layer; an adhesive layer carried by the backing layer; and a facing layer formed of a plurality of closely spaced, finely divided natural cork particles pretreated with a liquid cork-softening agent, said cork particles being rooted into the adhesive layer and bonded thereby to the backing layer and substantially completely covering the same to present an upper surface of natural cork, said cork particles in the main having an abraded upper surface to provide a lip-engaging surface on said tipping characterized by a smoothness representative of essentially contiguous cork particles abraded to a smooth texture on their exposed upper surface.

2. A cigarette tipping material having the surface texture of natural cork tipping material comprising a tissue paper backing layer; a thin adhesive layer carried by the backing layer; and a facing layer formed of a plurality of closely spaced natural cork particles of an average fineness to pass through a 90 mesh U. S. Standard screen pretreated with a liquid cork-softening agent, said cork particles being rooted into the adhesive layer and projecting thereabove and substantially completely covering the backing layer and adhesive layer to present an upper surface substantially wholly of natural cork, said cork particles in the main having an abraded upper surface to provide a lip-engaging surface on said tipping characterized by the smoothness of essentially contiguous cork particles abraded to a smooth texture on their exposed upper surface.

3. A cigarette tipping material in accordance with claim 1 in which the cork-softening agent is selected from the group consisting of glycerine, propylene glycol, sorbitol, and mixtures thereof.

4. A cigarette tipping material in accordance with claim 1 in which the natural cork facing layer consists essentially of glycerine-treated reground cork particles.

5. In a method of making cigarette tipping, the steps comprising applying to a thin flexible backing layer a thin layer of adhesive, depositing onto said adhesive a layer of natural cork particles which have been pretreated with a liquid cork-softening agent, said cork particles being of an average fineness to pass through a 90 mesh U. S. Standard screen and of greater average dimension than the thickness of said adhesive layer so as to extend thereabove when rooted therein, bonding said cork particles to said backing layer through said adhesive, and abrading said cork particles in the area above said adhesive to produce a smooth surface constituted substantially entirely of severed, softened cork particles substantially free of adhesive at the surface.

6. In a method of making cigarette tipping, the steps comprising treating cork particles with a liquid cork-softening agent to alter the texture thereof, applying a layer of adhesive to a paper backing web, depositing a layer of the treated cork particles onto the adhesive to cover the same throughout the effective area of the web to provide on said paper a layer of cork, the average thickness of which is not substantially greater than the average maximum dimension of the cork particles and in which the individual cork particles are rooted into the adhesive layer and extend thereabove, setting said adhesive to bond said layer of cork particles to said paper layer to form a surface which is characterized by projecting irregularly shaped cork particles rooted into said adhesive and bonded thereby to the paper web, and thereafter severing said cork particles in the area above said adhesive to produce a smooth surface constituted substantially entirely of severed, softened cork particles substantially free of adhesive at the surface.

References Cited in the file of this patent

UNITED STATES PATENTS

| Number | Name | Date |
| --- | --- | --- |
| 573,796 | Rockwell | Dec. 22, 1896 |
| 1,031,613 | Antoni | July 2, 1912 |
| 1,153,574 | Rovira et al. | Sept. 14, 1915 |
| 1,170,102 | Raschig | Feb. 1, 1916 |
| 1,476,226 | Grimoin-Sanson | Dec. 4, 1923 |
| 1,558,563 | Newton | Oct. 27, 1925 |
| 2,097,089 | Munroe | Oct. 26, 1937 |
| 2,463,952 | Cooke | Mar. 8, 1949 |